United States Patent [19]
Munden

[11] 3,919,994
[45] Nov. 18, 1975

[54] IGNITION SYSTEM FOR ROTARY INTERNAL COMBUSTION ENGINES

[75] Inventor: Curtis D. Munden, Anderson, Ind.

[73] Assignee: General Motors Corporation, Detroit, Mich.

[22] Filed: Nov. 11, 1974

[21] Appl. No.: 522,616

[52] U.S. Cl. ........ 123/148 DS; 123/148 E; 123/8.09
[51] Int. Cl.² ............................................. F02P 3/02
[58] Field of Search ......... 123/8.09, 117 R, 148 DS, 123/148 E

[56] References Cited
UNITED STATES PATENTS

| | | | |
|---|---|---|---|
| 3,534,717 | 10/1970 | Froede .......................... | 123/148 DS |
| 3,554,092 | 1/1971 | Shibagaki ...................... | 123/148 DS |
| 3,573,545 | 4/1971 | Warner .......................... | 123/117 R |
| 3,584,608 | 6/1971 | Shibagaki ...................... | 123/148 DS |
| 3,704,591 | 12/1972 | Tatsutomi ...................... | 123/148 DS |
| 3,716,991 | 2/1973 | Tatsutomi et al. ............. | 123/148 DS |
| 3,735,739 | 5/1973 | Panhard ......................... | 123/148 DS |
| 3,752,128 | 8/1973 | Tatsutomi et al. ............. | 123/148 DS |
| 3,809,042 | 5/1974 | Hosho et al. ................... | 123/148 E |
| 3,831,571 | 8/1974 | Weber ............................ | 123/148 E |
| 3,868,928 | 3/1975 | Kishimoto et al. ............. | 123/117 R |

Primary Examiner—Charles J. Myhre
Assistant Examiner—Joseph Cangelosi
Attorney, Agent, or Firm—Richard G. Stahr

[57] ABSTRACT

An electronic ignition system and ignition coil is provided for each the leading and trailing spark plugs of a rotary internal combustion engine. A series of alternating current signals, produced in timed relationship with the engine, are applied simultaneously to the leading spark plug ignition system and a delay circuit. In response to each cycle of the series of alternating current signals, the leading spark plug ignition system establishes and abruptly interrupts the primary winding of the leading spark plug ignition coil and the delay circuit produces both a synchronizing signal having leading and trailing edges corresponding to the negative to positive and positive to negative zero crossover points, respectively, and a trailing spark plug ignition signal delayed in time from the positive to negative zero crossover point. Logic circuitry responsive to the leading edge of the synchronizing signal and the trailing spark plug ignition signal produces a trailing spark plug ignition system dwell signal of a pulse width equal to the time therebetween which is applied to the input circuit of the trailing spark plug electronic ignition system.

5 Claims, 4 Drawing Figures

IGNITION SYSTEM FOR ROTARY INTERNAL COMBUSTION ENGINES

This invention is directed to an ignition system for rotary internal combustion engines and, more specifically, to an ignition system of this type which provides a period of delay between the generation of respective ignition potentials for the leading and trailing spark plugs of the associated engine in response to the same series of alternating current signals produced in timed relationship with the engine.

As is well known in the internal combustion engine art, the typical rotary internal combustion engine is made up of one or more housing structures, each having axially spaced end walls, and a peripheral wall having an epitrochoidal shaped inner surface interconnecting the end walls to form a cavity therebetween and a rotary piston or rotor member in the form of a curvilinear triangle with three apices rotatably mounted within each cavity. Two spark plugs, generally termed the leading spark plug and the trailing spark plug, are provided for each of the combustion chambers of the engine and are arranged one behind the other in the direction of rotation of the rotary piston or rotor member, the trailing spark plug being behind the leading spark plug with respect to the direction of rotation whereby an apex of the rotary piston or rotor passes over the trailing spark plug and the leading spark plug in sequence according to the rotation of the rotary piston or rotor. With applications with which it is desirable to provide a period of delay between the generation of an ignition potential for the leading spark plug or plugs and the generation of an ignition potential for the trailing spark plug or plugs, prior art systems employ circuitry which provides a delay period of a constant period of time. For efficient engine operation, the delay period is not the same time for all engine speeds, consequently, delay circuits which provide a substantially constant time delay are not ideal for this application. As the ideal period of delay between the generation of the leading and trailing spark plug ignition potentials is a function of engine crankshaft degrees of rotation, an ignition system for rotary internal combustion engines which provides a period of delay between the generation of leading and trailing spark plug ignition potentials by a constant selectable number of engine crankshaft degrees regardless of engine speed is desirable.

It is, therefore, an object of this invention to provide an improved ignition system for rotary internal combustion engines.

It is another object of this invention to provide an improved ignition system for rotary internal combustion engines which provides a period of delay between the generation of leading and trailing spark plug ignition potentials.

It is a further object of this invention to provide an improved ignition system for rotary internal combustion engines which provides a period of delay of a constant selectable number of engine crankshaft degrees at all engine speeds between the generation of leading and trailing spark plug ignition potentials.

In accordance with this invention, an ignition system for rotary internal combustion engines is provided wherein, in response to the same series of alternating current signals produced in timed relationship with the engine, a period of delay of a constant selectable number of engine crankshaft degrees at all engine speeds is provided between the generation of leading and trailing spark plug ignition potentials.

For a better understanding of the present invention, together with additional objects, advantages and features thereof, reference is made to the following description and accompanying drawing in which:

FIG. 1 sets forth the ignition system for rotary internal combustion engines of this invention in block form;

Throughout the several FIGURES of the drawing, like elements have been assigned like characters of reference.

Figure 1:
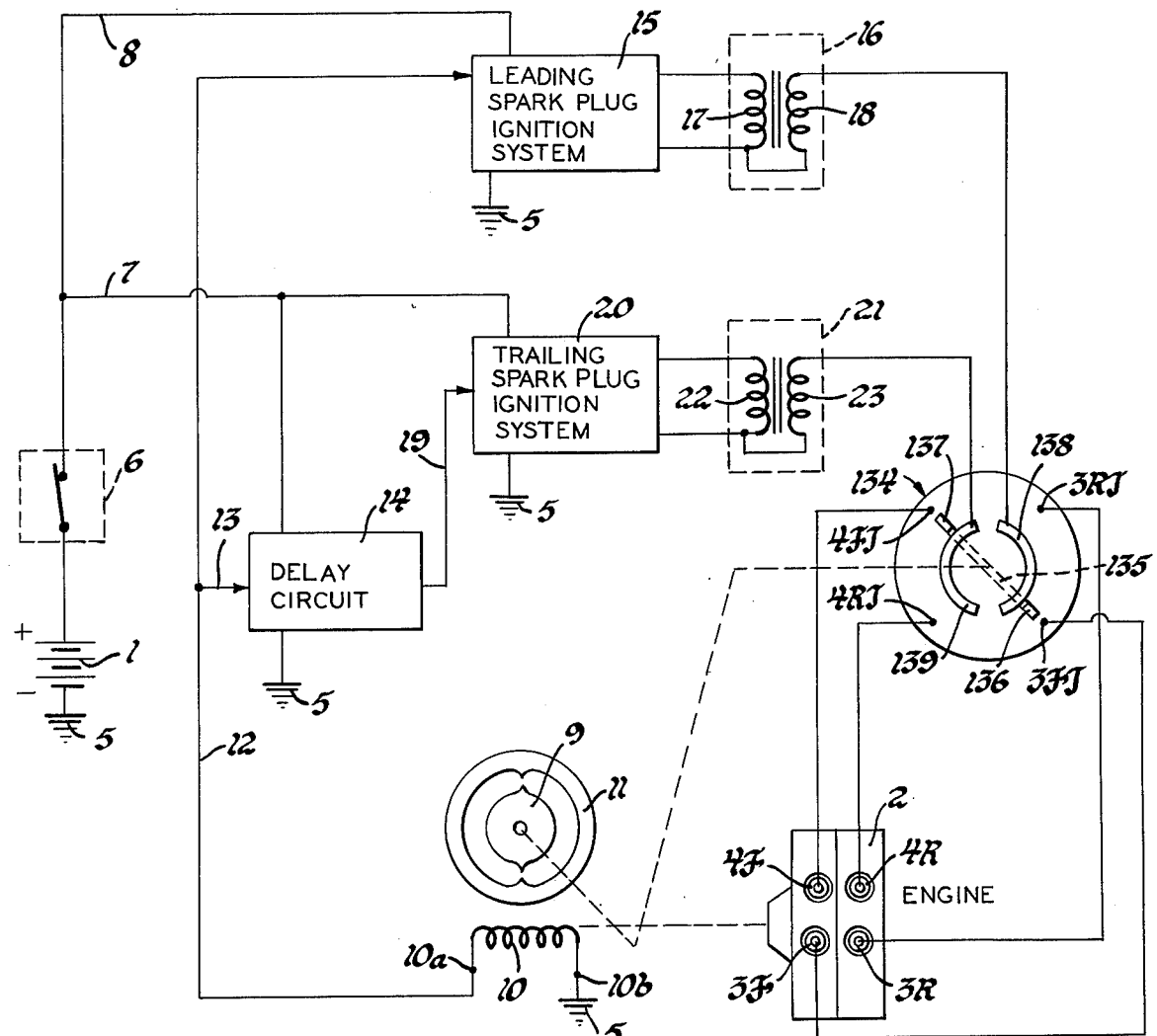
Figure 2:
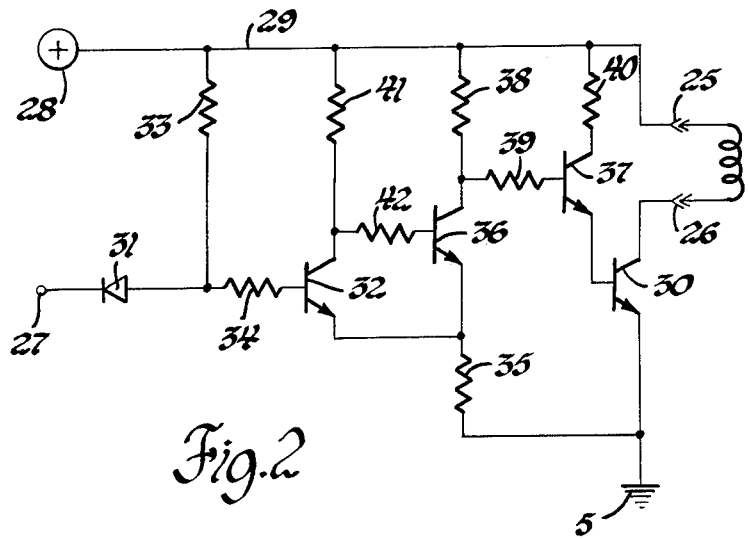
FIG. 2 is a schematic diagram of an electronic ignition system circuit suitable for use with the ignition system of this invention.
Figure 3:
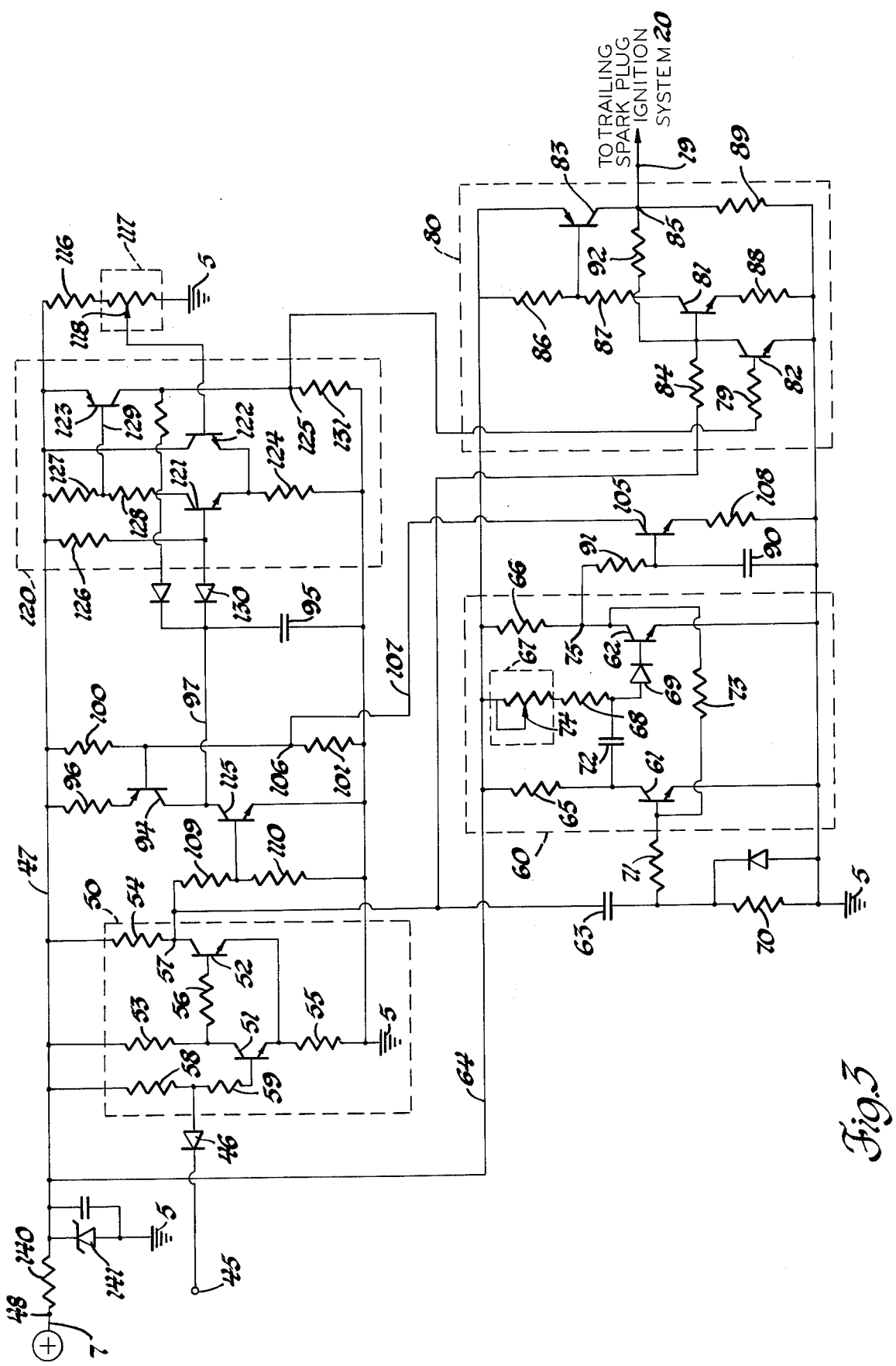
FIG. 3 is a schematic diagram of a delay circuit which provides a period of delay of a constant selectable number of engine crankshaft degrees between the generation of leading and trailing spark plug ignition potentials.

As the point of reference or ground potential is the same point electrically throughout the system, it has been illustrated in FIGS. 1, 2 and 3 by the accepted schematic symbol and referenced by the numeral 5.

Referring to FIG. 1 of the drawing, the ignition system for rotary internal combustion engines of this invention is set forth in block form in combination with a source of direct current operating potential which may be a battery 1 or any other suitable direct current potential source.

For purposes of this specification and without intention or inference of a limitation thereto, the rotary engine 2 is illustrated as having two cylinders generally referred to as the front and rear cylinders. The leading spark plug and the trailing spark plug for the combustion chamber of the front cylinder are identified, respectively, by reference numerals 3F and 4F and the leading spark plug and the trailing spark plug for the combustion chamber of the rear cylinder are identified, respectively, by the reference numerals 3R and 4R.

To supply operating potential to the system, the movable contact of an electrical switch 6 may be closed to the stationary contact thereof to place battery potential across leads 7 and 8 and point of reference or ground potential 5. The movable and stationary contacts of switch 6 may be a pair of normally open contacts included in a conventional automotive ignition switch of a type well known in the automotive art. For purposes of this specification, it will be assumed that the movable contact of electrical switch 6 is electrically closed to the stationary contact thereof, as shown in FIG. 1.

A series of alternating current signals may be produced in timed relationship with engine 2 by any one of the several magnetic distributors well known in the automotive art. One example of a magnetic distributor well known in the automotive art suitable for use with the ignition system of this invention is of the variable reluctance type disclosed and described in U.S. Pat. No. 3,254,247, Falge, which issued May 31, 1966 and is assigned to the same assignee as is the present application. In the interest of reducing drawing complexity, the variable reluctance type ignition distributor disclosed and described in the aforementioned patent has been set forth in schematic form in FIG. 1. A rotor member 9 is rotated in timed relationship with the engine by the engine in a manner well known in the automotive art within the cylindrical bore of pole piece 11.

Equally spaced about the outer periphery of rotor 9 and about the cylindrical bore of pole piece 11 are opposing projections equal in number to the number of cylinders of the engine with which the distributor and ignition system is being used. Pole piece 11 may be made up of a stack of a number of laminations of magnetic material secured in stacked relationship by rivets or bolts or other fastening methods and the magnetic flux may be provided by a permanent magnet, not shown, which may be secured to the lower face surface thereof. As each projection or rotor member 9 approaches a projection on pole piece 11, the reluctance of the magnetic path between pole piece 11 and rotor 9 decreases and as each projection on rotor 9 moves away from a projection on pole piece 11, the reluctance of the magnetic circuit between pole piece 11 and rotor 9 increases. Consequently, the magnetic field produced by the permanent magnet increases and decreases as each projection on rotor 9 approaches and passes a projection on pole piece 11, a condition which induces an alternating current potential in pickup coil 10, which is magnetically coupled to pole piece 11. During each positive polarity cycle of the series of alternating current signals induced in pickup coil 10, terminal 10a thereof is of a positive polarity with respect to terminal end 10b and during each negative polarity cycle, terminal end 10a is of a negative polarity with respct to terminal end 10b. The series of alternating current signals produced by the magnetic distributor just described are of a waveform as shown by curve A of FIG. 4 which illustrates the series of alternating current signals produced in timed relationship with the engine. As viewing FIG. 4, the alternating current signals are illustrated as increasing in freqency from left to right, the frequency of the last two complete cycles being twice the frequency of the first two complete cycles.

A leading spark plug electronic ignition system 15 including an ignition coil 16 having a primary winding 17 and a secondary winding 18 and a trailing spark plug electronic ignition system 20 including an ignition coil 21 having a primary winding 22 and a secondary winding 23 are provided. An electronic ignition system suitable for use as both the leading spark plug and trailing spark plug electronic ignition systems is set forth in schematic form in FIG. 2 and is of the type responsive to electrical signals of a selected polarity for completing and of another polarity for interrupting an energizing circuit across the source of direct current potential for the primary winding of the corresponding ignition coil.

The series of alternating current signals induced in pickup coil 10 are applied simultaneously to the operating signal input terminal of the leading spark plug electronic ignition system 15 through lead 12 and to the operating signal input circuit terminal of a delay circuit 14, schematically set forth in detail in FIG. 3, through leads 12 and 13.

Referring to FIG. 2, operating potential is supplied to the electronic ignition system circuit by battery 1, the positive polarity terminal of which is connected to positive polarity lead 29 through switch 6, lead 8. FIG. 1, and operating potential input terminal 28. Primary winding 17 of leading spark plug ignition coil 16 or primary winding 22 of trailing spark plug ignition coil 21 may be connected across output terminals 25 and 26. The energizing circuit across battery 1 for the primary winding connected across output terminals 25 and 26 may be traced from the positive polarity terminal of battery 1, FIG. 1, through the closed electrical contacts of switch 6, lead 8, operating potential input terminal 28, FIG. 2, positive polarity potential lead 29, the primary winding connected across output terminals 25 and 26, the collector-emitter electrodes of switching transistor 30 and point of reference or ground potential 5 to the negative polarity terminal of battery 1. To complete and interrupt the energizing circuit for the primary winding connected across output terminals 25 and 26, therefore, switching transistor 30 must be operated to be conductive and not conductive through the collector-emitter electrodes, respectively.

Referring to FIG. 3, operating potential is supplied to delay circuit 14 by battery 1, the positive polarity terminal of which is connected to positive polarity lead 47 through switch 6, FIG. 1, lead 7 and operating potential input terminal 48, FIG. 3. Included in delay circuit 14 is a Schmitt trigger circuit 50 including two NPN transistors 51 and 52 having the collector-emitter electrodes thereof connected across positive polarity lead 47 and point of reference or ground potential 5 through respective collector resistors 53 and 54 and common emitter resistor 55. This trigger circuit is responsive to the alternating current input signal, supplied to operating signal input circuit terminal 45 through leads 12 and 13, for producing a direct current potential synchronizing signal, curve B of FIG. 4, having leading and trailing edges corresponding to the negative to positive polarity zero crossover point and to the positive to negative polarity zero crossover point, respectively, of each cycle of the alternating current input signal. During the negative polarity half cycles of the alternating current input signal, diode 46 is forward poled. While diode 46 is forward poled, base-emitter drive current is diverted therethrough from transistor 51, consequently, transistor 51 is not conductive. While transistor 51 is not conductive, base-emitter drive current is supplied to transistor 52 through resistors 53 and 56, consequently, transistor 52 is conducting through the collector-emitter electrodes and the output signal thereof, which appears across junction 57 and point of reference or ground potential 5, is "low" or above ground potential by a level equal to the collector-emitter drop of transistor 52 and the drop across common emitter resistor 55.

At the moment a cycle of the series of alternating current signals passes through the negative to positive polarity zero crossover point and during the remainder of the positive polarity cycle, the potential upon operating signal input terminal 27, FIG. 2 of the leading spark plug electronic ignition system 15 is of a positive polarity which reverse biases diode 31. While diode 31 is reverse biased, base-emitter drive current is supplied to NPN transistor 32 through operating potential input terminal 28, lead 29, resistors 33 and 34 and emitter resistor 35. While base-emitter drive current is supplied to transistor 32, this device conducts through the collector-emitter electrodes thereof to drain base-emitter drive current from NPN transistor 36, consequently, transistor 36 is not conductive. While transistor 36 is not conductive, base-emitter drive current is supplied to NPN transistor 37 through input terminal 28, lead 29 and resistors 38 and 39. While base-emitter drive current is supplied to transistor 37, this device conducts through the collector-emitter electrodes and base-emitter drive current is supplied to switching transistor 30 through operating potential input terminal 28 through lead 29, resistor 40 and the collector-emitter electrodes of transistor 37. While base-emitter drive current is being supplied to switching transistor 30, this device conducts through the collector-emitter electrodes to complete the previously described energizing circuit for primary winding 17 of leading spark plug ignition coil 16. Simultaneously, the potential upon operating signal input terminal 45, FIG. 3, of the delay circuit 14 is of a positive polarity which reverse biases diode 46. While diode 46 is reverse biased, collector-emitter drive current is supplied through resistors 58 and 59 to transistor 51, consequently, transistor 51 conducts through the collector-emitter electrodes. With transistor 51 conducting through the collector-emitter electrodes, base drive current is diverted therethrough from transistor 52, consequently, transistor 52 extinguishes. When transistor 52 extinguishes, the output synchronizing signal of Schmitt trigger circuit 50 is "high", curve B of FIG. 4, or of a positive polarity upon junction 57 with respect to point of reference or ground potential 5 and of a magnitude substantially equal to the supply potential of battery 1 minus the drop across resistor 54. This rise of the output signal of Schmitt trigger circuit 50 is the leading edge of the synchronizing signal.

The synchronizing signal is applied through coupling capacitor 63 to the input circuitry of a conventional monostable multivibrator circuit 60 and to the base electrode of NPN transistor 81 of logic circuit 80. Monostable multivibrator circuit 60 includes two NPN transistors 61 and 62 having the collector-emitter electrodes thereof connected across positive polarity potential lead 47 through lead 64 and respective collector resistors 65 and 66 and point of reference or ground potential 5. As is well known in the electronics art, the monostable multi-vibrator circuit normally operates in a stable state and may be triggered to an alternate state by an electrical signal, in which it remains for a period of time as determined by an interior R-C timing network. After "timing out", the device spontaneously returns to the stable state. In the stable state, base-emitter drive current is supplied to NPN transistor 62 through potentiometer 67, series resistor 68 and diode 69, consequently, transistor 62 is conductive through the collector-emitter electrodes. At the moment the synchronizing signal goes "high", coupling capacitor 63 begins to charge and the charging current produces a potential drop across series resistor 70 which is of a sufficient magnitude to supply base-emitter drive current to NPN transistor 61 through base resistor 71. Consequently, transistor 61 is triggered conductive by the leading edge of the synchronizing signal. When transistor 61 begins to conduct, base drive current is diverted therethrough from transistor 62, consequently, transistor 62 extinguishes, timing capacitor 72 charges through potentiometer 67, resistor 68 and the collector-emitter electrodes of transistor 61 to point of reference or ground potential 5 and monostable multivibrator circuit 60 is in the alternate state to which it is triggered by the leading edge of the synchronizing signal. When in the alternate state, the output signal of monostable multivibrator circuit 60 is "high" and is of a positive polarity upon junction 75 with respect to point of reference or ground potential 5, curve C of FIG. 2. Simultaneously, the synchronizing signal produces base-emitter drive current through current limiting resistor 84 and NPN transistor 81 of logic circuit 80, NPN transistor 82 being not conductive at this time. While base-emitter drive current is supplied to transistor 81, this device conducts through the collector-emitter electrodes thereof which are connected across positive polarity lead 47 and point of reference or ground potential 5 through lead 64, series collector resistors 86 and 87 and emitter resistor 88. While transistor 81 conducts, emitter-base drive current is supplied to PNP transistor 83, consequently this device conducts through the emitter-collector electrodes. While transistor 83 conducts through the emitter-collector electrodes, the resulting flow of curent produces a trailing spark plug ignition system dwell signal across resistor 89 which is of a positive polarity upon junction 85 with respect to point of reference or ground potential 5, curve G of FIG. 4. This positive polarity dwell signal is applied to the operating signal input circuit terminal of the trailing spark plug electronic ignition circuit 20, FIG. 1, through lead 19. Upon the rise of the trailing spark plug ignition system dwell signal, therefore, trailing spark plug ignition system 20 operates to complete the energizing circuit for primary winding 22 of trailing spark plug ignition coil 21, in a manner previously explained in detail in regard to FIG. 2.

At the moment the cycle, under consideration, of the series of alternating current signals passes through the positive to negative polarity zero crossover point and during the remainder of the negative half cycle, the potential upon operating signal input terminal 27, FIG. 2, of the leading spark plug electronic ignition system 15 is of a negative polarity which forward biases diode 31. At the moment diode 31 becomes forward biased, base-emitter drive current is diverted therethrough from transistor 32 to extinguish this device. With transistor 32 not conducting, base-emitter drive current is supplied to transistor 36 through operating potential input terminal 28, lead 29 and resistors 41 and 42. While base-emitter drive current is supplied to transistor 36, this device conducts through the collector-emitter electrodes to drain base-emitter drive current from transistor 37, consequently, transistor 37 extinguishes. When transistor 37 extinguishes, base-emitter drive current is no longer supplied to switching transistor 30, consequently, switching transistor 30 extinguishes to abruptly interrupt the energizing circuit for primary winding 17 of the leading spark plug ignition coil 16. Upon the interruption of the energizing circuit for primary winding 17, an ignition spark potential is induced in secondary winding 18. Simultaneously, the potential upon operating signal input terminal 45, FIG. 3, of delay circuit 14 is of a negative polarity which forward biases diode 46. At the moment diode 46 becomes forward biased and for the remainder of the negative half cycle, base-emitter drive current is diverted therethrough from transistor 51, consequently, transistor 51 is extinguished and remains not conductive. While transistor 51 is not conductive, base-emitter drive current is supplied to transistor 52 through operating potential input terminal 48, lead 47 and resistors 53 and 56, consequently, transistor 52 conducts through the collector-emitter electrodes. Upon the conduction of transistor 52, the output synchronizing signal of Schmitt trigger circuit 50 goes "low", curve B of FIG. 4, and is above ground potential by a level equal to the collector-emitter drop of transistor 52 and the drop across common emitter resistor 55. This fall of the output signal of Schmitt trigger circuit 50 is the trailing edge of the synchronizing signal. At this time, NPN transistor 83 of logic circuit 80, FIG. 3, is conducting through the emitter-collector electrodes. Therefore, even though the positive polarity potential synchronizing signal is removed from the base electrode of PNP transistor 81, conducting transistor 83 supplies base-emitter drive current to transistor 81 through resistor 92 to maintain transistor 81 conductive. While transistor 81 conducts, the circuit through which emitter-base drive current is supplied to PNP transistors 83 is maintained through the collector-emitter electrodes of transistor 81, to maintain transistor 83 conductive. The logic circuit, therefore, "latches" in to maintain transistor 83 conductive and, consequently, to maintain the trailing spark plug ignition system dwell signal across junction 85 and point of reference or ground potential 5, curve G of FIG. 4.

The operation of the remainder of delay circuit 14 to terminate the trailing spark plug ignition system dwell signal a predetermined number of engine crankshaft degrees after each cycle of the series of alternating current input signals induced in pickup coil 10 passes through the positive to negative polarity zero crossover point will now be explained in detail.

Figure 4:
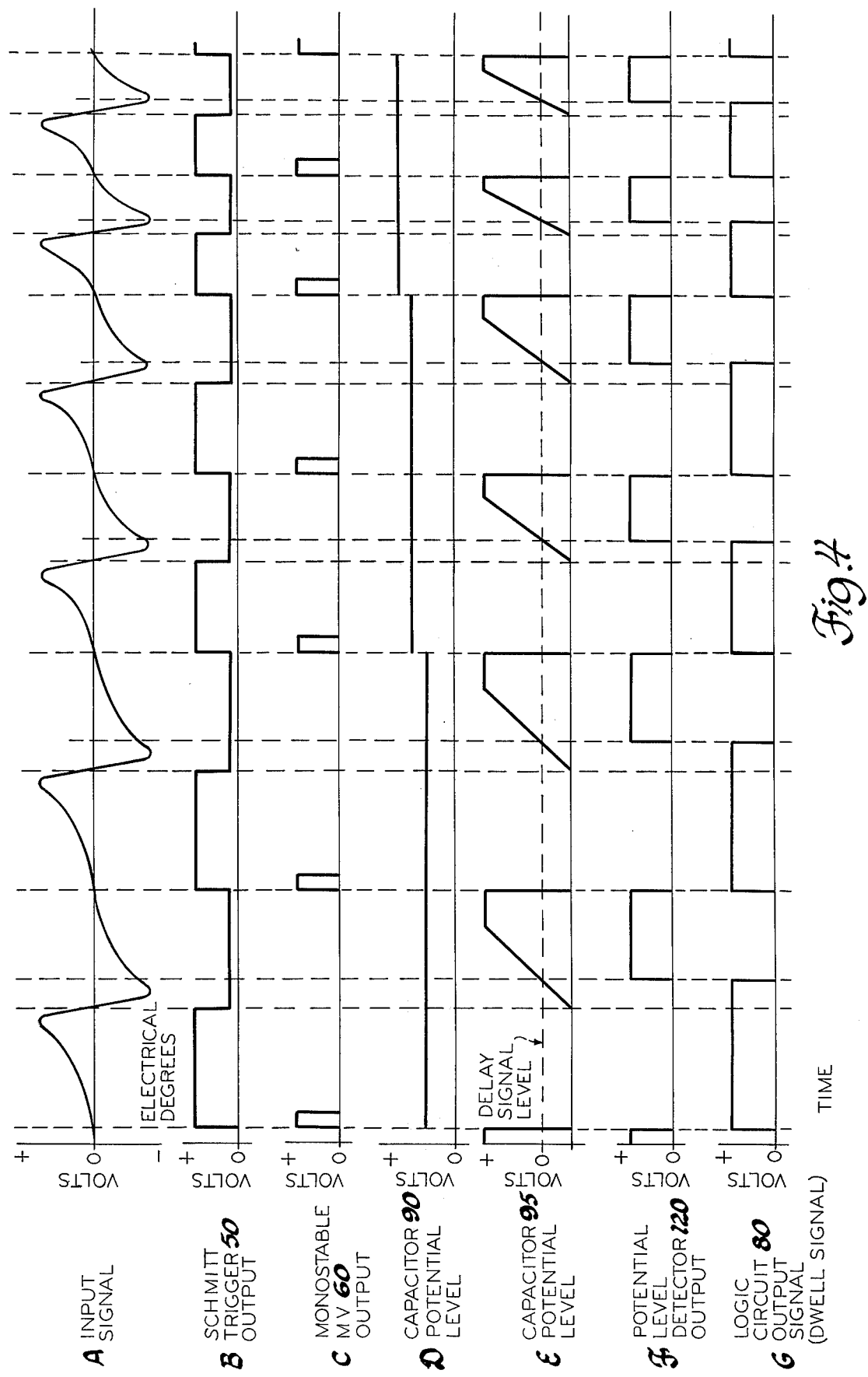
FIG. 4 is a set of curves useful in understanding the operation of the ignition system of this invention.

As has been previously brought out, monostable multi-vibrator circuit 60 is triggered to the alternate state by the leading edge of the synchronizing signal and, while in the alternate state, timing capacitor 72 charges and the output signal thereof is "high" of a positive polarity upon junction 75 with respect to point of reference or ground potential 5, curve C of FIG. 4. When timing capacitor 72 has become charged, base-emitter drive current is again supplied to transistor 62 to trigger this device conductive through the collector-emitter electrodes. When transistor 62 conducts through the collector-emitter electrodes, the output of monostable multivibrator circuit 60 goes "low", with the potential upon junction 75 being above ground potential by an amount equal to the collector-emitter drop of transistor 62. This substantially ground potential is fed back through feedback resistor 73 to the base electrode of transistor 61 to help trigger this device not conductive, thus enhancing the switching action of monostable multivibrator 60 from the alternate to the stable state. The pulse width of each of the output signals of monostable multivibrator circuit 60 is determined by the R-C time constant of the charging circuit for timing capacitor 72, as is well known in the electronics art. Therefore, monostable multivibrator circuit 60 produces a series of output signal pulses, curve C of FIG. 4, in response to the leading edge of the synchronizing signals and of a width determined by the R-C time constant of the charging circuit for timing capacitor 72. While the output signal of monostable multivibrator circuit 60 is "high", capacitor 90 charges through resistor 91. As capacitor 90 is charged by the "high" output signal of monostable multi-vibrator circuit 60 while this device is in the alternate state and since monostable multivibrator circuit 60 is triggered to the alternate state at the frequency of the alternating current input signal, capacitor 90 becomes charged to a direct current potential level directly proportional to the frequency of the alternating current input signal, curve D of FIG. 4. For reasons to be hereinafter explained, this signal will be termed the range signal. From this description, it is apparent that monostable mulivibrator circuit 60 and capacitor 90 comprise circuitry responsive to each leading edge of the synchronizing signals for producing a range signal, curve D of FIG. 4, of a direct current potential level directly proportional to the frequency of the alternating current input signal, or engine speed.

To produce a direct current potential ramp timing signal, the emitter-collector electrodes of a PNP transistor 94 and a timing circuit capacitor 95 are connected in series across battery 1 through a circuit which may be traced from the positive polarity terminal of battery 1 of FIG. 1, through switch 6, lead 7, the operating potential input circuit terminal 48 of FIG. 3, positive lead 47, emitter resistor 96, the emitter-collector electrodes of transistor 94, lead 97, timing circuit capacitor 95 and point of reference or ground potential 5 to the negative polarity terminal of battery 1. While transistor 94 is conductive through the emitter-collector electrodes, therefore, timing circuit capacitor 95 receives a direct current potential charge which increases linearly in potential level at a rate determined by the degree of conduction through transistor 94. The base electrode of transistor 94 is connected to the junction between resistors 100 and 101 connected in series across positive polarity lead 47 and point of reference or ground potential 5. The ohmic value of resistor 101, therefore, establishes the minimum amount of emitter base drive current supplied transistor 94, and hence, the minimum degree of conduction through the emitter-collector electrodes thereof and the minimum rate at which the direct current potential charge upon timing circuit capacitor 95 increases linearly in potential level. The timing circuit just described, however, is electrically arranged to be influenced by the range signal produced by monostable multivibrator circuit 60 and capacitor 90. The base electrode of NPN transistor 105 is connected to the junction between resistor 91 and capacitor 90, consequently, the charge upon capacitor 90, the range signal, supplies base-emitter drive current to transistor 105 to render transistor 105 conductive through the collector-emitter electrodes, the degree of conduction being proportional to the magnitude of the range signal, the charge upon capacitor 90. Conducting transistor 105 establishes an electrical circuit in parallel with resistor 101 to point of reference or ground potential 5 which may be traced from junction 106, through lead 107, the collector-emitter electrodes of transistor 105 and emitter resistor 108 to point of reference or ground potential 5. While transistor 105 is conducting, therefore, the emitter-base drive current supplied to transistor 94 is greater than the minimum as determined by resistor 101 by an amount proportional to the degree of conduction through transistor 105 which results in a greater emitter-collector current flow through transistor 94 by an amount proportional to the greater emitter-base drive current supplied thereto. Therefore, the greater the degree of conduction through transistor 94, the greater is the rate at which the direct current potential charge upon timing capacitor 95 increases linearly in potential level. As the range signal potential level magnitude determines the degree of conduction through transistor 105 and is of a direct current potential level directly proportional to the frequency of the series alternating current input signals and since the degree of emitter-collector conduction through transistor 94 increases under the influence of an increasing range signal to more rapidly charge capacitor 95, the net result is a direct current potential ramp timing signal generator circuit, which is synchronized with the input signal cycles and produces a direct current potential ramp timing signal which increases linearly in potential magnitude at a rate or slope which is a function of input signal frequency, curve E of FIG. 4.

The synchronizing signals produced by Schmitt trigger circuit 50 are also applied across resistors 109 and 110 connected in series across junction 57 and point of reference or ground potential 5. The base electrode of NPN transistor 115 is connected to the junction between series resistors 109 and 110, the emitter electrode thereof is connected to point of reference or ground potential 5 and the collector electrode is connected to the junction between the collector electrode of transistor 94 and timing circuit capacitor 95. During the presence of each of the synchronizing signals, base-emitter drive current is supplied to transistor 115 through positive polarity lead 47 and resistors 54 and 109 to maintain transistor 115 conductive through the collector-emitter electrodes. While transistor 115 is conductive, any charge upon timing circuit capacitor 95 is discharged therethrough and the timing circuit is disenabled as the collector-emitter electrodes of conducting transistor 115 establish a substantially short circuit across timing circuit capacitor 95, thus preventing capacitor 95 from receiving a charge. In the absence of the synchronizing signals, transistor 115 is not conductive through the collector-emitter electrodes, consequently, timing circuit capacitor 95 receives a charge through the circuit previously described. Transistor 115 and the associated series resistors 109 and 110, therefore, comprise circuit means responsive to the presence of each of the synchronizing signals for resetting and disenabling the timing circuit and to the absence of the synchronizing signal for enabling the timing circuit. Timing circuit capacitor 95 may not become fully charged during the time the timing circuit is enabled. Without intention or inference of a limitation, curve E of FIG. 4 illustrates that timing capacitor 95 does become fully charged during this period.

As the timing circuit is enabled during the absence of synchronizing signals and since the synchronizing signals are absent during the negative polarity half cycles of the series alternating current input signals, the timing circuit comprising transistor 94, resistors 96, 100 and 101 and timing circuit capacitor 95 produces a direct current potential ramp timing signal, curve E of FIG. 4, which is initiated at the positive to negative polarity zero crossover point of each cycle of the alternating current input signal and increases linearly in potential level at a rate determined by the potential level of the range signal.

To select the number of electrical degrees from the positive to negative polarity zero crossover point of each cycle of all frequencies of a variable frequency alternating current input signal at which an output signal is to be produced, the required number of engine crankshaft degrees delay, circuitry is provided for producing a delay signal of a selectable direct current potential level. This circuit includes resistor 116 and potentiometer 117 connected in series across positive polarity lead 47 and point of reference or ground potential 5. The direct current potential level of the delay signal is equal to the potential across movable contact 118 of potentiometer 117 and point of reference or ground potential 5 and is, therefore, selectable by adjusting movable contact 118.

A potential level detector circit 120 senses the direct current potential ramp timing signal and the direct current delay signal and produces an output signal, curve F of FIG. 4, when the potential level of the timing signal increases to a direct current potential level approximately 0.7 volt, the drop across diode 130, less than that of the delay signal. Potential level detector circuit 120 includes NPN transistors 121 and 122 and PNP transistor 123. While the delay signal is of a potential magnitude greater than the timing signal, base-emitter drive current is supplied to transistor 122 from positive polarity lead 47, through resistor 116, through that portion of potentiometer 117 between the end thereof connected to resistor 116 and movable contact 118, the base-emitter electrodes of transistor 122, emitter resistor 124 and point of reference or ground potential 5 to the negative polarity terminal of battery 1, consequently, transistor 122 is conductive through the collector-emitter electrodes. With transistor 122 conductive through the collector-emitter electrodes, the potential drop across emitter resistor 124 is of a magnitude which places the emitter electrode of transistor 121 at substantially the same potential as the base electrode thereof, consequently, transistor 121 is not conductive. While transistor 121 is not conductive, there is no circuit through which emitter-base drive current is applied to PNP transistor 123, hence, the output signal across output circuit terminal 125 and point of reference or ground potential 5 is substantially ground potential. When the timing signal has increased to a magnitude approximately 0.7 volt, the drop across diode 130, less than the delay signal, diode 130 is reverse biased, consequently, base-emitter drive current is applied to transistor 121 from positive polarity lead 47, through resistor 126, the base-emitter electrodes of transistor 121, emitter resistor 124 and point of reference or ground potential 5 to the negative polarity terminal of battery 1 to trigger transistor 121 conductive through the collector-emitter electrodes, a condition which extinguishes transistor 122. While transistor 121 is conductive through the collector-emitter electrodes, current flows through series resistors 127 and 128 and a circuit is completed through which emitter-base drive current is supplied to transistor 123 which may be traced from positive polarity lead 47, through the emitter-base electrodes of transistor 123, lead 129, resistor 128, the collector-emitter electrodes of transistor 121, emitter resistor 124 and point of reference or ground potential 5 to the negative polarity terminal of battery 1. While transistor 121 is conducting, therefore, transistor 123 conducts through the collector-emitter electrodes and an output signal appears across output circuit terminal 125 and point of reference or ground potential 5 of a positive polarity upon output terminal 125 with respect to point of reference or ground potential 5 and of a magnitude equal to the potential drop across collector resistor 131, curve F of FIG. 4.

Referring to FIG. 4, with a delay signal of a direct current potential level indicated by the horizontal dashed line of curve E, the output electrical signal is delayed the same number of electrical degrees, 45 degrees, from the positive to negative polarity zero crossover point of each cycle of all frequencies of the variable frequency alternating current input signal.

For purposes of illustrating the operation of the electrical angle delay circuit of this invention, it will be assumed that the series of alternating current input signals have a minimum frequency of 60 cycles per second and that movable contact 74 of range adjustment potentiometer 67 is adjusted to the point at which timing capacitor 95 charges to 9 volts in 8 milliseconds which is at a rate of 1.125 volts per millisecond or 0.05 volt per electrical degree:

I. To obtain a delay period of 45 electrical degrees, movable contact 118 of potentiometer 117 is adjusted to the point at which a delay signal of a direct current potential level of 2.25 volts, the product of 45 electrical degrees multiplied by 0.05 volt per electrical degree, is present across movable contact 118 and point of reference or ground potential 5. At an input signal frequency of 60 cycles per second, the direct current potential ramp timing signal, the charge upon timing capacitor 95, rises to 2.25 volts in 2.0 milliseconds. At a 60 cycles per second frequency, 2.0 milliseconds of time is equivalent to 45 electrical degrees. At an input signal frequency of 80 cycles per second, monostable multivibrator circuit 60 is triggered to the alternating state at a frequency 1.33 times greater than at the 60 cycles per second input signal frequency. The range signal, therefore, is 1.33 times greater, curve D of FIG. 4, than at a 60 cycles per second input signal frequency. This greater direct current potential range signal produces a 1.33 times greater collector-emitter conduction through transistor 105, consequently, emitter-collector conduction through transistor 94 is 1.33 times greater to charge timing capacitor 95 at a rate 1.33 times faster. At an input signal frequency of 80 cycles per second, therefore, timing capacitor 95 charges to 9 volts in 6 milliseconds, which is at a rate of 1.5 volts per millisecond, to produce a direct current potential ramp timing signal which rises to 2.25 volts in 1.5 milliseconds. At an 80 cycles per second frequency, 1.5 milliseconds of time is equivalent to 45 electrical degrees. At an input signal frequency of 120 cycles per second, mono-stable multivibrator circuit 60 is triggered to the alternating state at a frequency 2.0 times greater than at the 60 cycles per second input signal frequency. The range signal, therefore, is 2.0 times greater, curve D of FIG. 4, than that at a 60 cycles per second input signal frequency. This greater direct current potential range signal produces a 2.0 times greater collector-emitter conduction through transistor 105, consequently, emitter-collector conduction through transistor 94 is 2.0 times greater to charge timing capacitor 95 at a rate 2.0 times faster. At an input signal frequency of 120 cycles per second, therefore, timing capacitor 95 charges to 9 volts in 4 milliseconds, which is at a rate of 2.25 volts per millisecond, to produce a direct current potential ramp timing signal which rises to 2.25 volts in 1.0 millisecond. At a 120 cycles per second frequency, 1.0 millisecond of time is equivalent to 45 electrical degrees. Consequently, potential level detector circuit 120 produces an output signal 45 electrical degrees after each positive to negative polarity zero crossover point of the alternating current input signal at all input signal frequencies.

II. To obtain a delay period of 30 electrical degrees, movable contact 118 of potentiometer 117 is adjusted to the point at which a delay signal of a direct current potential level of 1.5 volts, the product of 30 electrical degrees multiplied by 0.05 volt per electrical degree, is present across movable contact 118 and point of reference or ground potential 5. At an input signal frequency of 60 cycles per second, the direct current potential ramp timing signal, the charge upon timing capacitor 95, rises to 1.5 volts in 1.3 milliseconds. At a 60 cycles per second frequency, 1.3 milliseconds of time is equivalent to 30 electrical degrees. At an input signal frequency of 80 cycles per second, monostable multivibrator circuit 60 is triggered to the alternate state at a frequency 1.33 times greater than at the 60 cycles per second input signal frequency. The range signal, therefore is 1.33 times greater, curve D of FIG. 4, than at a 60 cycles per second input signal frequency. This greater direct current potential range signal produces a 1.33 times greater collector-emitter conduction through transistor 105, consequently, emitter-collector conduction through transistor 94 is 1.33 times greater to charge timing capacitor 95 at a rate 1.33 times faster. At an input signal frequency of 80 cycles per second, therefore, timing capacitor 95 charges to 9 volts in 6 milliseconds, which is at a rate of 1.5 volts per millisecond, to produce a direct current potential ramp timing signal which rises to 1.5 volts in 1.0 millisecond. At an 80 cycles per second frequency, 1.0 millisecond of time is equivalent to 30 electrical degrees. At an input signal frequency of 120 cycles per second, monostable multivibrator circuit 60 is triggered to the alternate state at a frequency 2.0 times greater than at the 60 cycles per second input signal frequency. The range signal, therefore, is 2.0 times greater, curve D of FIG. 4, than at a 60 cycles per second input signal frequency. This greater direct current potential range signal produces a 2.0 times greater collector-emitter conduction through transistor 105, consequently, emitter-collector conduction through transistor 94 is 2.0 times greater to charge timing capacitor 95 at a rate 2.0 times faster. At an input signal frequency of 120 cycles per second, therefore, timing capacitor 95 charges to 9 volts in 4 milliseconds, which is at a rate of 2.25 volts per millisecond, to produce a direct current potential ramp timing signal which rises to 1.5 volts in 0.65 millisecond. At 120 cycles per second frequency, 0.65 millisecond of time is equivalent to 30 electrical degrees. Consequently, potential level detector circuit 120 produces an output signal 30 electrical degress after each positive to negative polarity zero crossover point of the alternating current input signal at all input signal frequencies.

Upon the occurrence of an output signal from potential level detector circuit 120, curve F of FIG. 4, base-emitter drive current is supplied thereby through current limiting resistor 79 to NPN transistor 82 of logic circuit 80. This base-emitter drive current triggers transistor 82 conductive through the collector-emitter electrodes to divert base-emitter drive current from transistor 81 to extinguish transistor 81. When transistor 81 extinguishes, the circuit through which emitter-base drive current is supplied to transistor 83 is interrupted. At this time transistor 83 extinguishes and the trailing spark plug ignition system dwell signal, curve G of FIG. 4, is terminated as the potential across output terminal 85 and point of reference or ground potential 5 is substantially zero with transistor 83 not conducting.

Upon the termination of the trailing spark plug ignition system dwell signal, the diode of the trailing spark plug electronic ignition system 20 corresponding to diode 31 of the electronic ignition system circuit of FIG. 2 is forward biased. When this diode becomes forward biased, the electronic ignition system circuit operates in a manner previously described in regard to the circuit of FIG. 2 to abruptly interrupt the energizing circuit for primary winding 22 of trailing spark plug ignition coil 21. Upon the interruption of this primary winding energizing circuit, an ignition spark potential is induced in secondary winding 23.

From the preceding description of the ignition system of this invention, it is apparent that it is responsive to a series of alternating current input signals to establish and interrupt the energizing circuit for primary winding 17 of leading spark plug ignition coil 16 and to establish the energizing circuit for primary winding 22 of trailing spark plug ignition coil 21 and to interrupt this primary winding energizing circuit a preselectable, constant number of engine crankshaft degrees after the negative to positive polarity zero crossover point of each cycle of the input signals at all engine speeds. This provides for a constant delay period of a selectable same number of engine crankshaft degrees at all engine speeds between the generation of a leading spark plug ignition potential and the generation of a trailing spark plug ignition potential for the same engine combustion chamber.

Series resistor 140 and Zener diode 141 of FIG. 3 serve to "clip" high positive polarity potential transients which may appear upon the supply line to prevent destruction of the electronic circuitry, they prevent negative polarity potential transients from damaging the electronic circuitry, they protect the electronic circuitry from accidental power supply reverse polarity and provide a substantially constant direct current supply or operating potential across positive polarity potential bus 47 and point of reference or ground potential 5.

In a practical application of the ignition system for rotary internal combustion engines of this invention, an ignition distributor 134, FIG. 1, of the type disclosed and described in detail in copending United States patent application Ser. No. 418,675, Campbell et al., filed Nov. 23, 1971 and assigned to the same assignee as is this application, was employed. As is well known in the automotive art, ignition distributor 134 directs the high ignition arc potential induced in respective secondary windings 18 and 23 to the next spark plugs of engine 2 to be fired. Briefly, a rotor member 135 of an insulating material is rotated by the engine in a manner well known in the art. Secured to each end of rotor member 135 is a respective rotor segment 136 and 137 of electrically conductive material. Rotor segments 136 and 137 are passed in arc gap bridging relationship between a leading spark plug ignition potential conductive circuit terminal 138 and leading spark plug output terminals 3RT and 3FT and in arc gap bridging relationship between a trailing spark plug ignition potential conductive circuit terminal 139 and trailing spark plug output terminals 4RT and 4FT. With rotor member 135 in the position shown in FIG. 1, distributor 134 directs the leading spark plug ignition potential generated in secondary winding 18 of leading spark plug ignition coil 16 to leading spark plug 3F through leading spark plug ignition potential conductive circuit terminal 138, rotor segment 136, leading spark plug output terminal 3FT and the interconnecting electrical leads and directs the trailing spark plug ignition potential generated in secondary winding 23 of trailing spark plug ignition coil 21 to trailing spark plug 4F through trailing spark plug ignition potential conductive circuit terminal 139, rotor segment 137, trailing spark plug output terminal 4FT and the interconnecting electrical leads.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An ignition system for a rotary internal combustion engine having a leading and a trailing spark plug for each combustion chamber thereof comprising in combination with a source of direct current potential: means for producing a series of alternating current signals in timed relationship with an engine; a leading spark plug electronic ignition system including an ignition coil having primary and secondary windings and a trailing spark plug electronic ignition system including an ignition coil having primary and secondary windings, each of said electronic ignition systems having input circuit means and being of the type responsive to electrical signals of a selected polarity for completing and of another polarity for interrupting an energizing circuit across said source of direct current potential for the said primary winding of the corresponding said ignition coil; means for applying said series of alternating current signals to said input circuit means of said leading spark plug electronic ignition system; circuit means responsive to said series of alternating current signals for producing direct current potential synchronizing signals having leading and trailing edges corresponding to the negative to positive polarity zero crossover point and to the positive to negative polarity zero crossover point, respectively, of each cycle of said series of alternating current signals; circuit means responsive to said leading edge of said synchronizing signals for producing a range signal of a direct current potential level directly proportional to the frequency of said series of alternating current signals; timing circuit means arranged to be electrically influenced by said range signal for producing a direct current potential ramp timing signal which is initiated at the positive to negative polarity zero crossover point of each cycle of said series of alternating current signals and increases linearly in potential level at a rate determined by the potential level of said range signal; means for producing a delay signal of a selectable direct current potential level; circuit means responsive to said timing signal and said delay signal for producing a trailing spark plug ignition signal when said timing signal increases to a direct current potential level equal to that of said delay signal; logic circuit means responsive to said leading edge of each of said synchronizing signals and to said trailing spark plug ignition signal for producing a trailing spark plug ignition system dwell signal of a selected polarity and of a pulse width equal to the period between said leading edge of said synchronizing signals and said trailing spark plug ignition signal; and means for applying said trailing spark plug ignition system dwell signal to said input circuit means of said trailing spark plug electronic ignition system.

2. An ignition system for a rotary internal combustion engine having a leading an a trailing spark plug for each combustion chamber thereof comprising in combination with a source of direct current potential: means for producing a series of alternating current signals in timed relationship with an engine; a leading spark plug electronic ignition system including an ignition coil having primary and secondary windings and a trailing spark plug electronic ignition system including an ignition coil having primary and secondary windings, each of said electronic ignition systems having input circuit means and being of the type responsive to electrical signals of a selected polarity for completing and of another polarity for interrupting an energizing circuit across said source of direct current potential for the said primary winding of the corresponding said ignition coil; mans for applying said series of alternating current signals to said input circuit means of said leading spark plug electronic ignition system; circuit means responsive to said series of alternating current signals for producing direct current potential synchronizing signals having leading and trailing edges corresponding to the negative to positive polarity zero crossover point and to the positive to negative polarity zero crossover point, respectively, of each cycle of said series of alternating current signals; circuit means responsive to said leading edge of said synchronizing signals for producing a range signal of a direct current potential level directly proportional to the frequency of said series of alternating current signals; means for selectively adjusting the potential level of said range signal for any selected frequency of said series of alternating current signals; timing circuit means arranged to be electrically influenced by said range signal for producing a direct current potential ramp timing signal which is initiated at the positive to negative polarity zero crossover point of each cycle of said series of alternating current signals and increases linearly in potential level at a rate determined by the potential level of said range signal; means for producing a delay signal of a selectable direct current potential level; circuit means responsive to said timing signal and said delay signal for producing a trailing spark plug ignition signal when said timing signal increases to a direct current potential level equal to that of said delay signal; logic circuit means responsive to said leading edge of each of said synchronizing signals and to said trailing spark plug ignition signal for producing a trailing spark plug ignition system dwell signal of a selected polarity and of a pulse width equal to the period between said leading edge of said synchronizing signals and said trailing spark plug ignition signal; and means for applying said trailing spark plug ignition system dwell signal to said input circuit means of said trailing spark plug electronic ignition system.

3. An ignition system for a rotary internal combustion engine having a leading and a trailing spark plug for each combustion chamber thereof comprising in combination with a source of direct current potential: means for producing a series of alternating current signals in timed relationship with an engine; a leading spark plug electronic ignition system including an ignition coil having primary and secondary windings and a trailing spark plug electronic ignition system including an ignition coil having primary and secondary windings, each of said electronic ignition systems having input circuit means and being of the type responsive to electrical signals of a selected polarity for completing and of another polarity for interrupting an energizing circuit across said source of direct current potential for the said primary winding of the corresponding said ignition coil; means for applying said series of alternating current signals to said input circuit means of said leading spark plug electronic ignition system; circuit means responsive to said series of alternating curent signals for producing direct current potential synchronizing signals having leading and trailing edges corresponding to the negative to positive polarity zero crossover point and to the positive to negative polarity zero crossover point, respectively, of each cycle of said series of alternating current signals; circuit means responsive to said leading edge of said synchronizing signals for producing a range signal of a direct current potential level directly proportional to the frequency of said series of alternating current signals; means for selectively adjusting the potential level of said range signal for any selected frequency of said series of alternating current signals; timing circuit means arranged to be electrically influenced by said range signal for producing a direct current potential ramp timing signal which is initiated at the positive to negative polarity zero crossover point of each cycle of said series of alternating current signals and increases linearly in potential level at a rate determined by the potential level of said range signal; circuit means responsive to the presence of said synchronizing signals for resetting and disenabling said timing circuit means and to the absence of said synchronizing signals for enabling said timing circuit means; means for producing a delay signal of a selectable direct current potential level; circuit means responsive to said timing signal and said delay signal for producing a trailing spark plug ignition signal when said timing signal increases to a direct current potential level equal to that of said delay signal; logic circuit means responsive to said leading edge of each of said synchronizing signals and to said trailing spark plug ignition signal for producing a trailing spark plug ignition system dwell signal of a selected polarity and of a pulse width equal to the period between said leading edge of said synchronizing signals and said trailing spark plug ignition signal; and means for applying said trailing spark plug ignition system dwell signal to said input circuit means of said trailing spark plug electronic ignition system.

4. An ignition system for a rotary internal combustion engine having a leading and a trailing spark plug for each combustion chamber thereof comprising in combination with a source of direct current potential: means for producing a series of alternating current signals in timed relationship with an engine; a leading spark plug electronic ignition system including a leading spark plug ignition coil having primary and secondary windings and a trailing spark plug electronic ignition system including a trailing spark plug ignition coil having primary and secondary windings, each of said electronic ignition systems having input circuit means and being of the type responsive to electrical signals of a selected polarity for completing and of another polarity for interrupting an energizing circuit across said source of direct current potential for the said primary winding of the corresponding said ignition coil; means for applying said series of alternating current signals to said input circuit means of said leading spark plug electronic ignition system; circuit means responsive to said series of alternating current signals for producing direct current potential synchronizing signals having leading and trailing edges corresponding to the negative to positive polarity zero crossover point and to the positive to negative polarity zero crossover point, respectively, of each cycle of said series of alternating current signals; circuit means responsive to said leading edge of said synchronizing signals for producing a range signal of a direct current potential level directly proportional to the frequency of said series of alternating current signals; means for selectively adjusting the potential level of said range signal for any selected frequency of said series of alternating current signals; timing circuit means arranged to be electrically influenced by said range signal for producing a direct current potential ramp timing signal which is initiated at the positive to negative polarity zero crossover point of each cycle of said series of alternating current signals and increases linearly in potential level at a rate determined by the potential level of said range signal; means for producing a delay signal of a selectable direct current potential level; circuit means responsive to said timing signal and said delay signal for producing a trailing spark plug ignition signal when said timing signal increases to a direct current potential level equal to that of said delay signal; logic circuit means responsive to said leading edge of each of said synchronizing signals and to said trailing spark plug ignition signal for producing a trailing spark plug ignition system dwell signal of a selected polarity and of a pulse width equal to the period between said leading edge of said synchronizing signals and said trailing spark plug ignition signal; means for applying said trailing spark plug ignition system dwell signal to said input circuit means of said trailing spark plug electronic ignition system; and an ignition distributor having a leading and a trailing spark plug ignition spark potential input terminal, each electrically connected, respectively, to said secondary winding of said leading and to said trailing spark plug ignition coil, an output terminal for each said leading spark plug of said engine electrically connected to the corresponding said leading spark plug, an output terminal for each said trailing spark plug of said engine electrically connected to the corresponding said trailing spark plug and a rotor member rotated in timed relationship with said engine having two electrically conductive rotor tips which are passed in arc gap relationship with said leading spark plug ignition spark potential input terminal and each of said leading spark plug output terminals and with said trailing spark plug ignition spark potential input terminal and each of said trailing spark plug output terminals.

5. An ignition system for a rotary internal combustion engine having a leading and a trailing spark plug for each combustion chamber thereof comprising in combination with a source of direct current potential: means for producing a series of alternating current signals in timed relationship with an engine; a leading spark plug electronic ignition system including a leading spark plug ignition coil having primary and secondary windings and a trailing spark plug electronic ignition system including a trailing spark plug ignition coil having primary and secondary windings, each of said electronic ignition systems having input circuit means and being of the type responsive to electrical signals of a selected polarity for completing and of another polarity for interrupting an energizing circuit across said source of direct current potential for the said primary winding of the corresponding said ignition coil; means for applying said series of alternating current signals to said input circuit means of said leading spark plug electronic ignition system; circuit means responsive to said series of alternating current signals for producing direct current potential synchronizing signals having leading and trailing edges corresponding to the negative to positive polarity zero crossover point and to the positive to negative polarity zero crossover point, respectively, of each cycle of said series of alternating current signals; circuit means responsive to said leading edge of said synchronizing signals for producing a range signal of a direct current potential level directly proportional to the frequency of said series of alternating current signals; means for selectively adjusting the potential level of said range signal for any selected frequency of said series of alternating current signals; timing circuit means arranged to be electrically influenced by said range signal for producing a direct current potential ramp timing signal which is initiated at the positive to negative polarity zero crossover point of each cycle of said series of alternating current signals and increases linearly in potential level at a rate determined by the potential level of said range signal; circuit means responsive to the presence of said synchronizing signals for resetting and disenabling said timing circuit means and to the absence of said synchronizing signals for enabling said timing circuit means; means for producing a delay signal of a selectable direct current potential level; circuit means responsive to said timing signal and said delay signal for producing a trailing spark plug ignition signal when said timing signal increases to a direct current potential level equal to that of said delay signal; logic circuit means responsive to said leading edge of each of said synchronizing signals and to said trailing spark plug ignition signal for producing a trailing spark plug ignition system dwell signal of a selected polarity and of a pulse width equal to the period between said leading edge of said synchronizing signals and said trailing spark plug ignition signal; means for applying said trailing spark plug ignition system dwell signal to said input circuit means of said trailing spark plug electronic ignition system; and an ignition distributor having a leading and a trailing spark plug ignition spark potential input terminal, each electrically connected, respectively, to said secondary winding of said leading and to said trailing spark plug ignition coil, an output terminal for each said leading spark plug of said engine electrically connected to the corresponding said leading spark plug, an output terminal for each said trailing spark plug of said engine electrically connected to the corresponding said trailing spark plug and a rotor member rotated in timed relationship with said engine having two electrically conductive rotor tips which are passed in arc gap relationship with said leading spark plug ignition spark potential input terminal and each of said leading spark plug output terminals and with said trailing spark plug ignition spark potential input terminal and each of said trailing spark plug output terminals.

* * * * *

UNITED STATES PATENT AND TRADEMARK OFFICE
CERTIFICATE OF CORRECTION

PATENT NO. : 3,919,994
DATED : November 18, 1975
INVENTOR(S) : Curtis D. Munden

It is certified that error appears in the above–identified patent and that said Letters Patent are hereby corrected as shown below:

```
Col.  3, line 28, "respct" should read -- respect --;
         line 34, "freqency" should read -- frequency --;
         line 62, after "lead 8" change the period "."
                  to a comma -- , --.
Col.  6, line 11, "curent" should read -- current --.
Col.  9, line 65, "circit" should read -- circuit --.
Col. 11, line 33, "mono-stable" should read -- monostable --.
Col. 12, line 36, "degress" should read -- degrees --.
Col. 14, line 54, after "leading" change "an" to -- and --.
Col. 15, line  1, "mans" should read -- means --;
         line 58, "curent" should read -- current --.
```

Signed and Sealed this sixteenth Day of March 1976

[SEAL]

Attest:

RUTH C. MASON
Attesting Officer

C. MARSHALL DANN
Commissioner of Patents and Trademarks